(12) United States Patent
Hasler et al.

(10) Patent No.: US 9,301,368 B2
(45) Date of Patent: Mar. 29, 2016

(54) ANTI-FLICKER APPARATUS FOR MOTION DETECTOR

(71) Applicants: Gregory Scott Hasler, Pekin, IL (US); Timothy Thomas Tutt, Mattoon, IL (US)

(72) Inventors: Gregory Scott Hasler, Pekin, IL (US); Timothy Thomas Tutt, Mattoon, IL (US)

(*) Notice: Subject to any disclaimer, the term of this patent is extended or adjusted under 35 U.S.C. 154(b) by 616 days.

(21) Appl. No.: 13/683,665

(22) Filed: Nov. 21, 2012

(65) Prior Publication Data

US 2013/0127345 A1 May 23, 2013

Related U.S. Application Data

(60) Provisional application No. 61/562,425, filed on Nov. 21, 2011.

(51) Int. Cl.
*H05B 37/00* (2006.01)
*H05B 37/02* (2006.01)

(52) U.S. Cl.
CPC ............ *H05B 37/02* (2013.01); *H05B 37/0227* (2013.01); *Y02B 20/44* (2013.01)

(58) Field of Classification Search
CPC ........... H05B 41/3924; H05B 37/0218; H05B 41/3927; H05B 37/02; H05B 37/0227; H05B 37/0281; H05B 41/382; H05B 37/0263; H05B 37/04; H05B 39/00; H05B 39/08; H05B 41/2851; H05B 41/2855; H05B 41/2858
See application file for complete search history.

(56) References Cited

U.S. PATENT DOCUMENTS

| | | | |
|---|---|---|---|
| 6,020,689 A | 2/2000 | Gradzki | |
| 7,274,154 B2 | 9/2007 | Atra | |
| 7,804,234 B2 | 9/2010 | Wursching | |
| 2006/0022611 A1* | 2/2006 | Rodriguez | 315/245 |
| 2011/0285310 A1* | 11/2011 | Leinen | 315/291 |
| 2013/0106303 A1* | 5/2013 | Yen | 315/206 |

* cited by examiner

*Primary Examiner* — Douglas W Owens
*Assistant Examiner* — Monica C King
(74) *Attorney, Agent, or Firm* — Chicago IP Law; Steven M. Evans

(57) ABSTRACT

An anti-flicker and anti-glow switchable load apparatus to be installed in the light socket of a commonly powered electronic switching device, such as a motion activated light switch. An energy efficient light bulb or lamp, such as a cathode fluorescent lamp or light emitting diode is then screwed into the apparatus. A first embodiment of the present invention includes a switchable light source, a switchable load, a controller, and a voltage sensor. When the present invention in the first embodiment detects a higher voltage, thus indicating the lamp has been switched from the "off" state to the on state, the switchable load is disconnected, and the current is re-routed to pass through the energy efficient lamp.

20 Claims, 5 Drawing Sheets

US 9,301,368 B2

ANTI-FLICKER APPARATUS FOR MOTION DETECTOR

REFERENCE TO RELATED APPLICATION

This patent application claims priority to U.S. provisional patent application entitled "CFL Anti Flicker Device," having Ser. No. 61/562,425 filed on Nov. 21, 2011, the entirety of which is hereby incorporated by reference into the present patent application.

BACKGROUND OF THE INVENTION

1. Field of the Invention

The present invention relates generally to lighting circuitry, and more particularly, to lighting circuitry for stabilizing operation of a high efficiency lighting element activated by an automated switching apparatus, such as a light switch motion detector.

2. Description of Related Art

Higher efficiency lighting elements, such as Cold Cathode Fluorescent Lamp (CCFL), are becoming extremely popular due to the current "Green" movement. Current government mandates are requiring incandescent bulbs to be phased out of production in favor high efficiency fluorescent light bulbs, such as CCFLs and Light Emitting Diodes (LEDs). Within the next few years incandescent light bulbs are not expected to be available in the marketplace of the United States.

While fluorescent light bulbs provide higher power efficiency and longer life expectancy, fluorescent light bulbs had several negative factors. For instance, it has been discovered that fluorescent light bulbs do not function properly when connected to commonly powered electronic switching devices such as motion detectors, electronic timers, and other devices requiring a low current to pass through the lighting element to provide power to the electronic switching device while the lighting element is in the "off" state. This is typically required due to the wiring limitations of residential homes and other building structures, wherein a small current is required to pass through the lighting element in order to provide current to the electronic switching device.

While the phenomena of current leakage in the off state has existed for quite some time, it has not typically been a problem with incandescent light bulbs. The filament used in incandescent light bulbs allows small currents to pass through the incandescent light bulbs without lighting the bulb because the small current does not experience enough resistance to cause the filament to heat up and glow or light.

High efficiency lighting element, however, such as CCFLs and Light Emitting Diodes (LEDs) are very sensitive to low currents, thus causing LEDs to emit a soft glow and CCFLs to flicker when a low current passes through theses lighting elements. Low currents cause the ballasts in CCFLs to false start which results in the lamp flickering on and off. The false start of the ballast discharges capacitors in CCFL ballast, and since there is not a significant line voltage present in the off state, the CCFL will flicker on and off. This flickering can become quite bothersome and annoying to individuals in the area. Furthermore, the flickering is damaging to the overall life of the CCFL.

Accordingly, there exists a need to provide a convenient and easily installed apparatus by consumers that can eliminate the flicker and glow from high efficiency lighting elements using commonly power electronic switching devices.

ASPECTS AND SUMMARY OF THE PRESENT INVENTION

In order to achieve these goals, an aspect of the present invention is to provide an inexpensive and energy efficient apparatus that can be easily installed by consumers between a light socket and an energy efficiency lighting element for light sockets controlled by commonly powered electronic switching devices to prevent flickering and glowing of the energy efficient lighting element during the off state.

In order to achieve these aspects, the present invention provides an anti-flicker and anti-glow apparatus to be installed in the light socket of a commonly powered electronic switching device, such as a motion activated light switch. An energy efficient light bulb or lamp, such as a CCFL, a Cathode Fluorescent Lamp (CFL), or an LED is then screwed into the apparatus. The present invention does not require any additional wiring or installation procedures. The present invention is simply screwed into the source light socket, and the energy efficient lamp is screwed into a second socket within the present invention.

A first embodiment of the present invention includes a switchable light source, a switchable load, a controller, and a voltage sensor. A second embodiment of the present invention includes a switchable load, a controller, a local power supply, and a voltage sensor. Both embodiments of the present invention are designed to provide a minimal load for the minor current to pass through in the "off" state. When the present invention in the first embodiment detects a higher current passing through the minimal load, and therefore a higher voltage, thus indicating the lamp has been switched from the "off" state to the on state, the switchable load is disconnected, and the current is re-routed to pass through the energy efficient lamp. Thus, no power is wasted passing current through the switchable load in the "on" state. In the second embodiment, when the present invention detects a higher current passing through the minimal load, and therefore a higher voltage, thus indicating the lamp has been switched from the "off" state to the on state, current through the switchable load is turned off, and the power current is directed to pass through the energy efficient lamp. In the second embodiment, the load resistor is used to hold the voltage low across the hot and neutral line, thus keeping the CCFL from firing.

The foregoing has outlined, rather broadly, the preferred features of the present invention so that those skilled in the art may better understand the detailed description of the invention that follows. Additional features of the invention will be described hereinafter that form the subject of the claims of the invention. Those skilled in the art should appreciate that they can readily use the disclosed invention and specific embodiments as a basis for designing or modifying other structures for carrying out the same purposes of the present invention, and that such other structures do not depart from the spirit and scope of the invention in its broadest form.

DETAILED DESCRIPTION OF THE PREFERRED EMBODIMENTS

Figure 1:
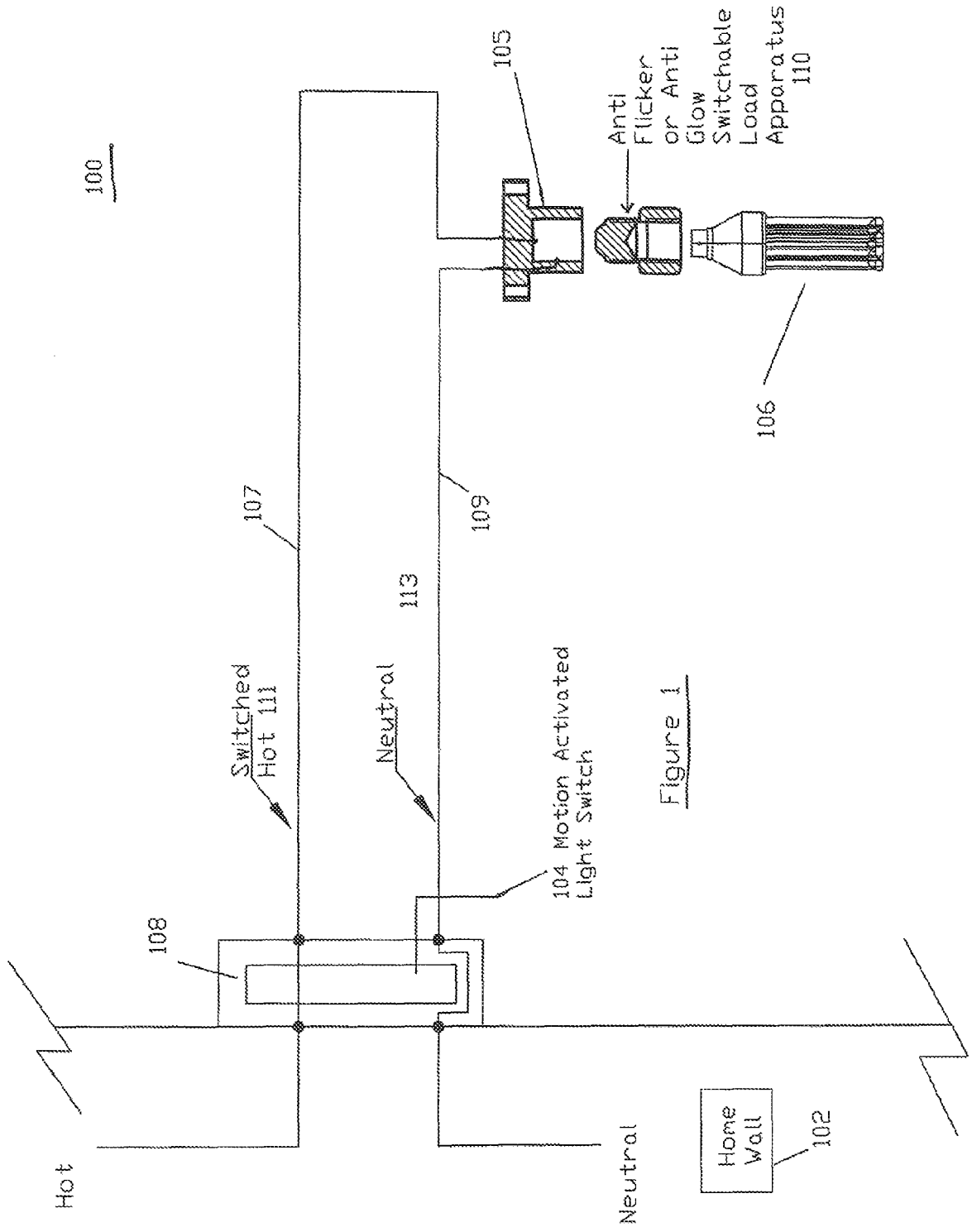
FIG. 1 is a circuit diagram showing the insertion of an anti-flicker apparatus configured in accordance with the present invention into a conventional residential light socket wiring diagram.

Referring now to the drawings, FIG. 1 illustrates a circuit diagram 100 of a conventional light socket wiring diagram of a residential home and internal wall 102, wherein a wall mounted, motion activated light switch 104 controlling an energy efficient light 106 is connected to a light socket 105 having a standard switched hot wire 107 and a standard neutral wire 109. As the diagram illustrates, a complete circuit must be established between hot node 111 and neutral node 113 of the light switch socket 108 in order to power the auto switch, here a motion detector 104, while the energy efficient lamp 106 is in the "off" state. While this is conventionally accomplished by passing a small current through the lamp 106 to complete the circuit and power the motion detector 104, this results in flickering or a soft glow in energy efficient lamps, as discussed above in the background of the invention section. In order to overcome this deficiency in the prior art, the present invention provides an anti-flicker or anti-glow switchable load apparatus 110 to carry the current during the "off" state, thus by-passing the energy efficient lamp 106 in the first embodiment of the invention, and minimizing current to the energy efficient lamp in the second embodiment of the present invention, thereby both first and second embodiments of the present invention preventing flickering or glowing of the energy efficient lamp 106. When the motion detector detects movement, and switches from an "off" state to an "on" state, thus providing increased voltage to the socket 105, the anti-flicker switchable load apparatus 110 detects the increased voltage, and re-directs or increases current flow, depending upon the embodiment of the invention, to the lamp 106 instead of a switchable load contained within the anti-flicker switchable load apparatus.

Figure 2:
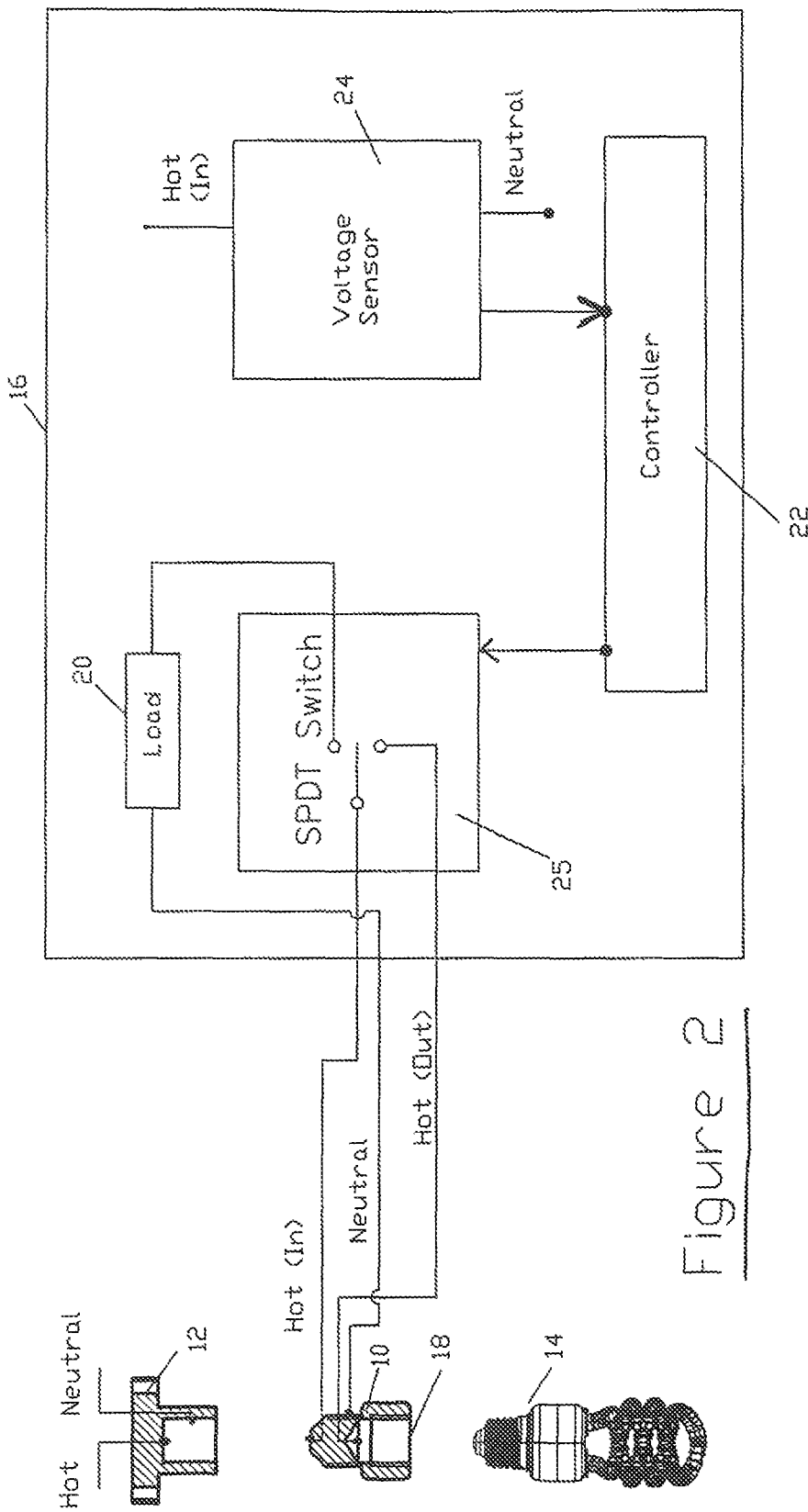
FIG. 2 is a block diagram of an anti-flicker apparatus configured in accordance with a first embodiment of the present invention.

FIG. 2 illustrates a block diagram of anti-flicker or anti-glow apparatus 10 configured in accordance with a first embodiment of the present invention. The apparatus 10 preferably is configured to be easily screwed into the original socket 12 of an electronically activated light source, such as an internal wall-mounted motion activated light switch using an energy efficient lamp 14, such as a CCFL or a CFL. The energy efficient lamp is simply screwed into the light socket 18 of the anti-flicker apparatus 10.

Block diagram 16 illustrates the internal electrical components of the anti-flicker apparatus 10 configured in accordance with a first embodiment of the present invention. Included in the anti-flicker apparatus 10 are a switchable load 20, a controller 22, a voltage sensor 24, and a switchable light source 23. In the illustrated embodiment, the switchable light source 25 is a Single-Pull Double-Through (SPDT) switch. The anti-flicker apparatus 10 is electrically connected between the light socket 12 and the energy efficient lamp 14. During the "off" state, a minimal current passes though the switchable load 20, thus preventing enough current to pass through the energy efficient lamp 14 to cause flicker or a soft glow. The voltage sensor 24 monitors the level of voltage between lines Hot (In) and Neutral. When the voltage level between lines Hot (In) and Neutral increases to a level to indicate the electronic switch, such as a motion sensor, has switched from an "off" state to an "on" state, the controller 22 will disconnect the Hot (In) line from switchable load 20, and connect it to Hot (Out) line, thus re-directing all the current to the lamp 14.

Figure 3:
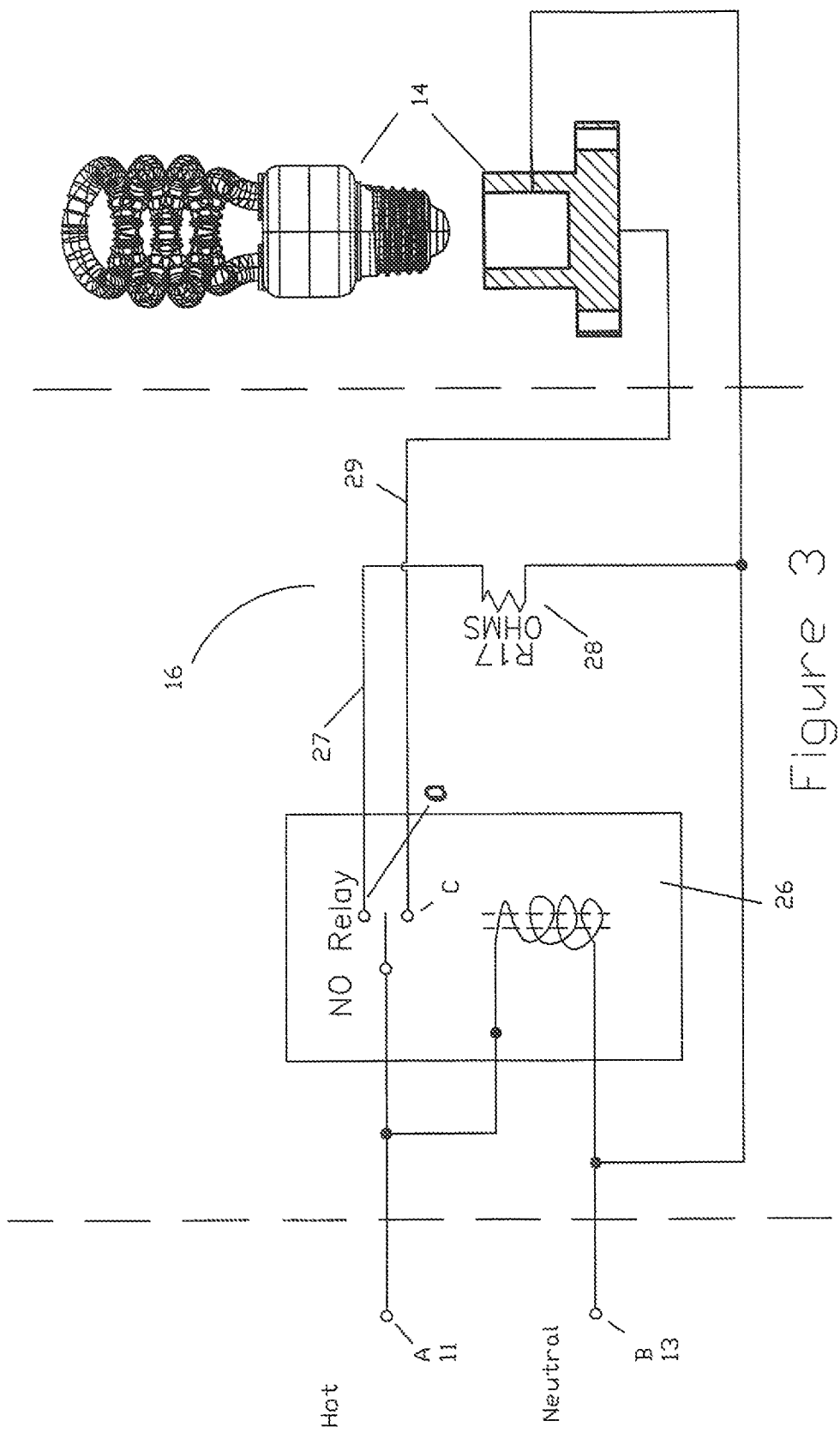
FIG. 3 is a circuit diagram of the block diagram shown in FIG. 2.

FIG. 3 is a circuit diagram corresponding to the block diagram shown in FIG. 2. The energy efficient lamp 14 is shown to be connected to the anti-flicker switchable load apparatus 16. The anti-flicker switchable load apparatus 16 includes a normally open relay 26 and a low-load resistor 28. The normally open relay 26 functions as the controller 22 and the voltage sensor 20. The resistor 28 functions as the switchable load 20. In the "off" state, the normal open relay 26 allows the small current, which provides power to the motion detector, to flow through line 27, which is connected to open position "O" of relay 26. The current passes through low-load resistor 28 to provide a complete circuit back to Neutral connection B 13. While the relay 28 is in the normal open position "O", no current flows to the lamp 14 via line 29 because it is an open circuit. While resistor 28 is illustrated as being 17 ohms, resistor 28 can be various low ohms values and still function properly.

When the motion detector detects movement and switches to the "on" state, the voltage level across nodes Hot (A) and Neutral (B) increases significantly, which is detected by the normally open "make before brake" relay 26. Sensing the increased voltage, the relay 26 switches to the closed position "C," thus allowing current to flow through line 29 to the lamp 14, and then line 27 changes to an open connection. This design eliminates power loss across the resistor 28 during the "on" state.

Figure 4:
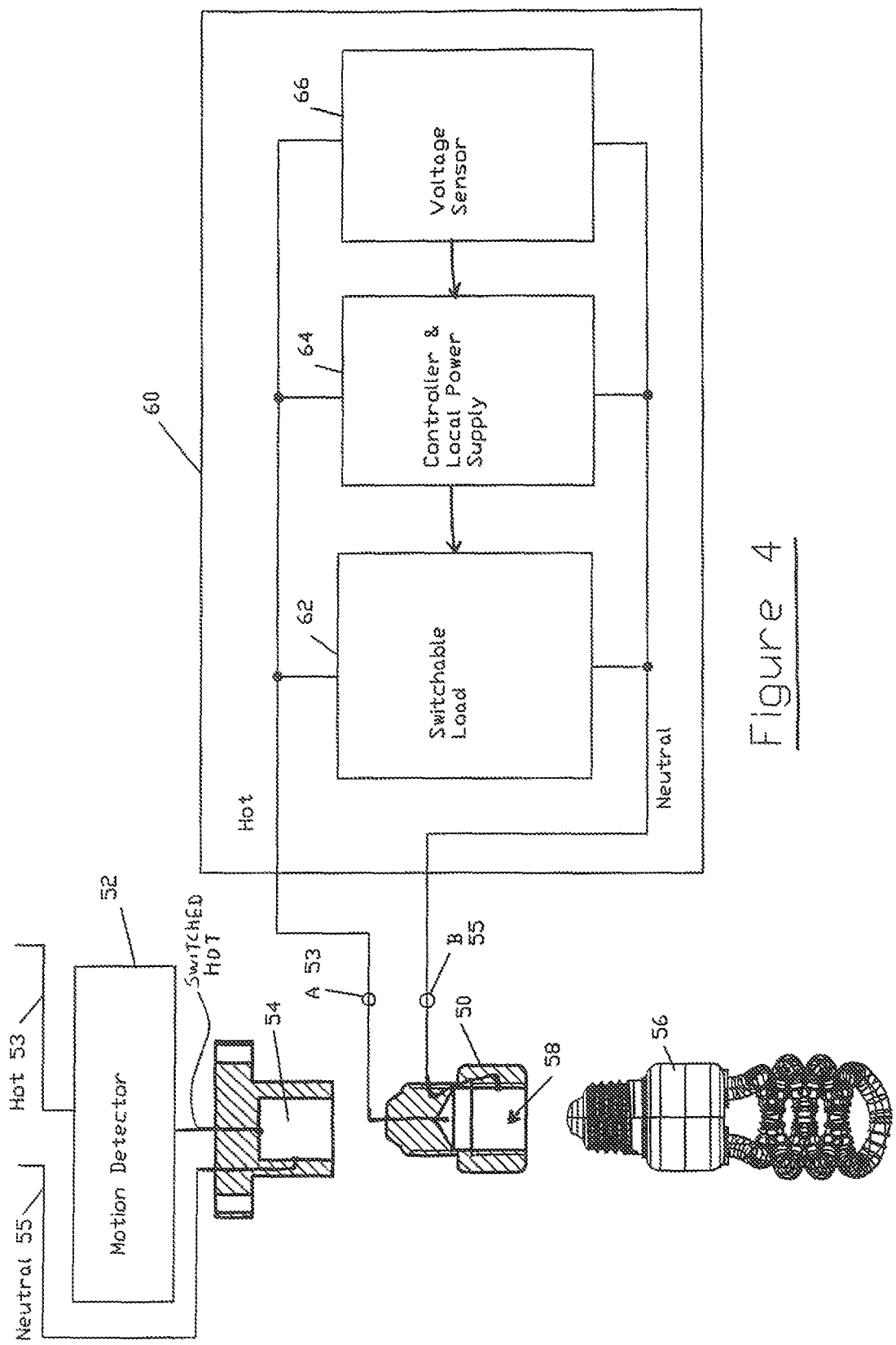
FIG. 4 is a block diagram of an anti-flicker apparatus configured in accordance with a second embodiment of the present invention.

FIG. 4 is a block diagram of an anti-flicker or anti-glow switchable load apparatus 50 configured in accordance with a second embodiment of the present invention. Illustrated is a motion detector 52 including a light socket 54 that is activated by the motion detector. The motion detector security light 52 is designed to be electrically connected and mounted to an electrical switch box for a light fixture having a "hot" wire connection 53 and a "neutral" wire connection 55. The components of the anti-flicker switchable load apparatus 50 are illustrated in the block diagram 60 shown in FIG. 4. The anti-flicker switchable load apparatus 50 includes a socket 58 for receiving an energy efficient lamp 56.

The block diagram 60 of the anti-flicker switchable load apparatus 50 include a switchable load 62, a controller and local power supply 64, and a voltage sensor 66. Similar to the first embodiment, the switchable load 62 provides a path for the small current providing power to the motion detector during the "off" state. The voltage sensor 66 monitors the voltage level between the hot lead 53 and the neutral lead 55. When the voltage level increases indicating that the motion detector 52 has detected an object and switched from the "off" state to the "on" state, the voltage sensor 66 detects the increase in voltage and signals the controller and local power supply 64. The controller and local power supply 64 then opens the switchable load 62, turning off current flow through the switchable load 62, and maximizing the current flow through the energy efficient lamp 56. When a decrease in voltage is detected by the voltage sensor 66, thus signaling the motion detector 52 has switched back to an "off" state, the controller and local power supply 64 detects the voltage drop from the voltage sensor 66 and closes the switchable load 62 to re-direct current through the switchable load. This reduces the voltage to the CCFL, thus keeping it from falsely firing.

Figure 5:
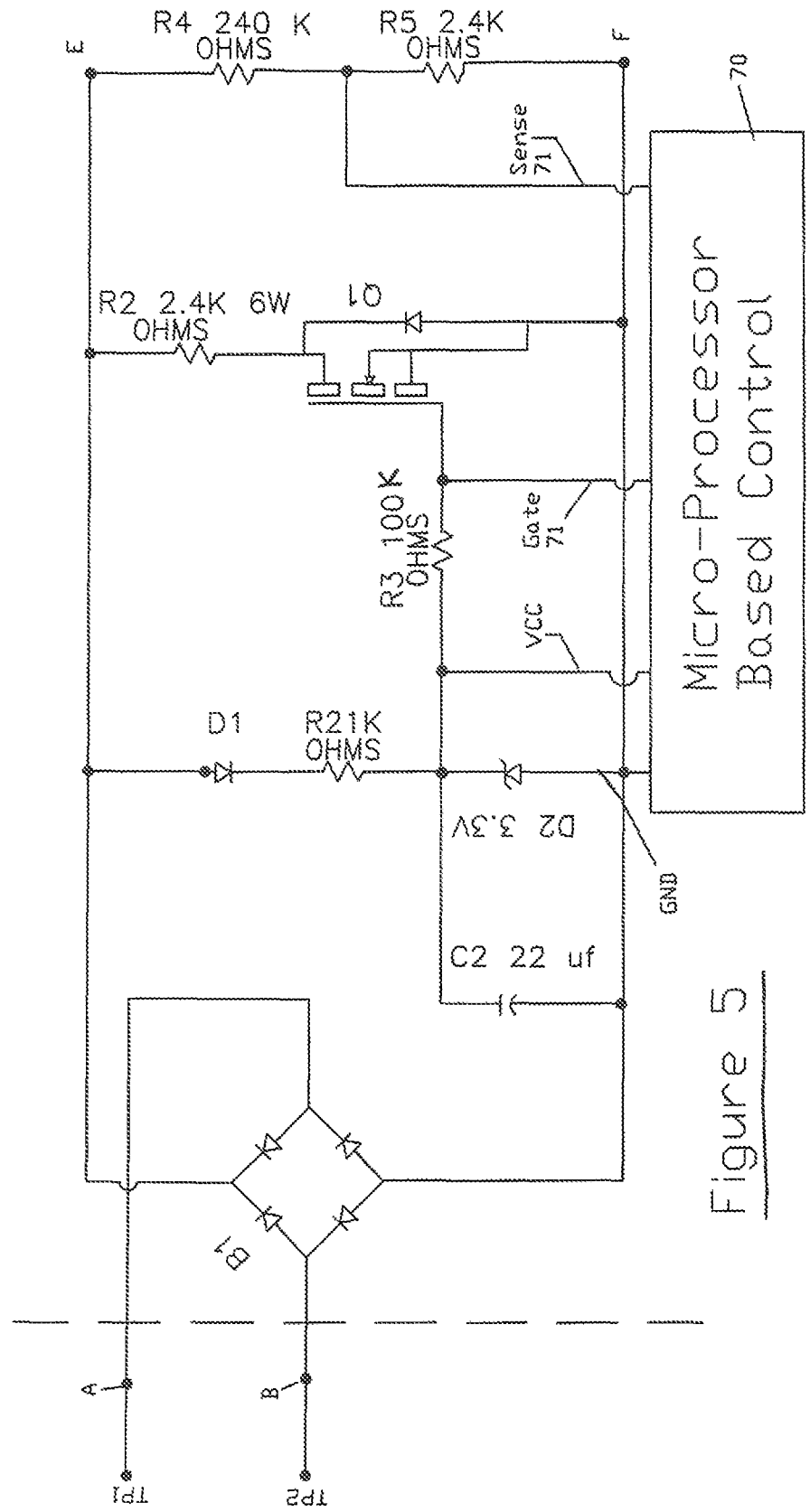
FIG. 5 is a circuit diagram of the block diagram shown in FIG. 4.

FIG. 5 is a circuit diagram of the block diagram 60 shown in FIG. 4. Resistors R4 and R5 function as the voltage sensor 66, and micro-processor based control functions as the controller 64. One suitable micro-processor that may be utilized in the illustrated circuit is a Texas Instrument micro-processor, part number MSP430F2001. Resistors R2 and R3 and mosfet Q1 function as the switchable load. Diode bridge B1, diode D1, resistor R1, capacitor C2, and zener diode D2 function as a power supply that is biased on.

The diode bridge B1 converts 120 volts RMS to a full wave The first component is a diode bridge. It converts the 120V RMS to a full wave 180 VDC. The resistor R1, capacitor C2, and zener diode D2 create a 3.3 v power supply to power the micro-processor 70. The microprocessor 70 monitors the voltage across nodes E and F via sense line 72, which is located between the resistor bridge R4 and R5. The microprocessor is programmed to control the switchable load 62 to provide power for the motion detector 52 if the "off" state.

The switchable load 62 includes the mosfet Q1 and the resistive load R2. The mosfet Q1 has a shunt resistor R3 on the gate to ensure the mosfet Q1 is off during power up. The microprocessor 70 activates the mosfet Q1 when current flow is necessary to provide power to the motion detector 52 and shuts it off when the motion detector 52 has turned on the light 56 so it does not waste power. This is accomplished though the gate control line 71 In this embodiment a microprocessor 70 was selected because of its price and ability to implement an intelligent switching load.

It should also be understood that the present invention is not limited to the specifically illustrated package designs. For example, the present invention also can be located within light socket fixture box, typically located within the ceiling of a home. Further, the present invention can be incorporated into various types of electronics switches, in addition to electronic switches such as motion detectors and electronic timers.

The invention claimed is:

1. An apparatus for stabilizing an energy efficient light connected to an electronic activated device, comprising:
   a housing including a light socket for receiving an energy efficient light having a hot electrical lead and a neutral electrical lead, and the housing including a threaded base for screwing into an electrical socket of an electronic activated device, wherein the hot electrical lead and the neutral electrical lead are electrically connected to the threaded base;
   an electrical switch within the housing;
   an electrical load within the housing and electrically connected in series with the electrical switch between the hot electrical lead and the neutral electrical lead, and the light socket and the electrical switch are electrically connected in series between the hot electrical lead and the neutral electrical lead;
   a voltage sensor within the housing and electrically connected between the hot electrical lead and the neutral electrical lead for detecting voltage level between the hot electrical lead and neutral electrical lead, and the voltage sensor is connected in parallel with the electrical switch and the electrical load;
   a controller for monitoring status of the voltage sensor and controlling the electrical switch;
   wherein the controller sets the electrical switch to direct current through the electrical load when an electronic activated device to be connected to the threaded base is in a light-off state causing a lower voltage to be detected by the voltage sensor, thereby enabling a controlled current to pass between the hot electrical lead and the neutral electrical lead via the threaded base and provide power to an electronic activated device to be connected to the threaded base, and the electrical switch is set to create an open circuit to the light socket of the housing so as to prevent any electrical current flowing to an energy efficient light to be located in the light socket of the housing; and
   wherein, when an electronic activated device to be connected to the threaded base is in a light-on state causing a higher voltage to be detected by the voltage sensor, the controller sets the electrical switch to direct current to flow through the light socket of the housing and activate an energy efficient light to be contained therein, and the electrical switch is set to create an open circuit to the electrical load so as to prevent any electrical current flowing to the electrical load and wasting energy thereto.

2. The apparatus of claim 1, further comprising:
   an electronic activated device having a threaded socket; and
   the threaded base of the housing is screwed into the threaded socket of the electronic activated device.

3. The apparatus of claim 2, wherein the electronic activated device includes a motion detector.

4. The apparatus of claim 1, further comprising:
   an energy efficient light connected to the light socket of the housing.

5. The apparatus of claim 1, wherein the voltage sensor and controller comprise a normally open relay switch that activates when voltage across the relay switch increases above a predetermined threshold.

6. The apparatus of claim 1, wherein the electrical load includes a resistor.

7. The apparatus of claim 2, wherein the electronic activated device includes an electronic timer.

8. The apparatus of claim 1, wherein the electronic switch includes a single-pull double-through (SPDT) switch.

9. An apparatus for providing a stable load to a remote parasitic powered control device to enable a remote parasitic powered control device to function properly with unstable and insufficient electrical loads, comprising:
   a housing including a light socket for receiving an energy efficient light having a hot electrical lead and a neutral electrical lead, and the housing including a threaded base for screwing into an electrical socket of a parasitic powered control device, wherein the hot electrical lead and the neutral electrical lead are electrically connected to the threaded base;
   an electrical switch within the housing;
   an electrical load within the housing and electrically connected in series with the electrical switch between the hot electrical lead and the neutral electrical lead, and the light socket and the electrical switch are electrically connected in series between the hot electrical lead and the neutral electrical lead;
   a voltage sensor within the housing and electrically connected between the hot electrical lead and the neutral electrical lead for detecting voltage level between the hot electrical lead and neutral electrical lead, and the voltage sensor is connected in parallel with the electrical switch and the electrical load;
   a controller for monitoring status of the voltage sensor and controlling the electrical switch;
   wherein the controller sets the electrical switch to direct current through the electrical load when a parasitic powered control device to be connected to the threaded base is in a light-off state causing a lower voltage to be detected by the voltage sensor, thereby enabling a controlled current to pass between the hot electrical lead and the neutral electrical lead via the threaded base and provide power to a parasitic powered control device to be connected to the threaded base, and the electrical switch is set to create an open circuit to the light socket of the housing so as to prevent any electrical current flowing to an energy efficient light to be located in the light socket of the housing; and wherein, when a parasitic powered control device to be connected to the threaded base is in a light-on state causing a higher voltage to be detected by the voltage sensor, the controller sets the electrical switch to direct current to flow through the light socket of the housing and activate an energy efficient light to be contained therein, and current flowing through the electrical load during a light-on state is minimal and does not prevent an energy efficient light from lighting.

10. The apparatus of claim 9, further comprising:
a motion detector connected to the apparatus.

11. The apparatus to claim 9, further comprising:
an energy efficient light connected to the light socket of the housing.

12. The apparatus of claim 9, wherein the controller is a microprocessor.

13. The apparatus of claim 9, wherein the electrical load is a resistor.

14. An apparatus for providing a stable load to a parasitic powered control device to enable a parasitic powered control device to function properly with unstable and insufficient electrical loads, comprising:
an electrical switch;
an electrical load electrically connected in series with the electrical switch between a hot electrical lead and a neutral electrical lead;
a voltage sensor for detecting voltage level between the hot electrical lead and the neutral electrical lead, and the voltage sensor being electrically connected between the hot electrical lead and the neutral electrical lead and in parallel with the electrical load and the electrical switch;
a controller including an algorithm that detects insufficient load for a parasitic powered control device, and the controller monitors status of the voltage sensor and controls the electrical switch;
wherein the controller sets the electrical switch to direct current through the electrical load when a parasitic powered control device to be connected to the apparatus is in a light-off state causing a lower voltage to be detected by the voltage sensor, thereby enabling a controlled current to pass between the hot electrical lead and the neutral electrical lead and provide power to a parasitic powered control device to be connected to the apparatus, and the electrical switch is set to create an open circuit to an energy efficient light so as to prevent any electrical current flowing to an energy efficient light; and wherein, when a parasitic powered control device to be connected to the apparatus is in a light-on state causing a higher voltage to be detected by the voltage sensor, the controller sets the electrical switch to direct current to flow through an energy efficient light to be contained therein.

15. The apparatus of claim 14, wherein the electrical switch is set to create an open circuit to the electrical load so as to prevent any electrical current flowing to the electrical load and wasting energy thereto when a powered parasitic control device to be connected to the apparatus is in the light-on state.

16. The apparatus of claim 14, further comprising:
a housing containing the hot electrical lead, the neutral electrical lead, the electrical switch, the electrical load, the voltage sensor, and the controller, and the housing includes a threaded base connected to the hot electrical lead and the neutral electrical lead.

17. The apparatus of claim 14, wherein the energy efficient light includes a CFL.

18. The apparatus of claim 14, wherein the energy efficient light includes an LED.

19. The apparatus of claim 14, wherein the housing is configured as a light socket housing.

20. The apparatus of claim 16, further comprising:
a parasitic powered control device having a threaded socket; and
the threaded base of the housing is screwed into the threaded socket of the parasitic powered control device.

* * * * *